(12) United States Patent
Goodrich

(10) Patent No.: US 9,981,824 B2
(45) Date of Patent: May 29, 2018

(54) CONTAINER AND CRANK APPARATUS FOR TIE-DOWN STRAPS

(71) Applicant: Lee Goodrich, St. George, UT (US)

(72) Inventor: Lee Goodrich, St. George, UT (US)

(*) Notice: Subject to any disclaimer, the term of this patent is extended or adjusted under 35 U.S.C. 154(b) by 145 days.

(21) Appl. No.: 15/230,212

(22) Filed: Aug. 5, 2016

(65) Prior Publication Data

US 2017/0036885 A1    Feb. 9, 2017

Related U.S. Application Data

(60) Provisional application No. 62/201,628, filed on Aug. 6, 2015.

(51) Int. Cl.
*B65H 75/30* (2006.01)
*B65H 18/08* (2006.01)
*B65H 54/58* (2006.01)
*B60P 7/08* (2006.01)
*B65H 75/02* (2006.01)

(52) U.S. Cl.
CPC ............ *B65H 75/30* (2013.01); *B60P 7/0846* (2013.01); *B65H 18/085* (2013.01); *B65H 54/585* (2013.01); *B65H 75/02* (2013.01); *B65H 2701/375* (2013.01)

(58) Field of Classification Search
CPC .... B65H 18/026; B65H 18/085; B65H 18/10; B65H 75/02; B65H 75/30; B65H 2701/375; B65H 54/585; B60P 7/0846
See application file for complete search history.

(56) References Cited

U.S. PATENT DOCUMENTS

| | | | |
|---|---|---|---|
| 9,856,075 B2* | 1/2018 | Breeden, III | B65D 85/62 |
| 9,925,911 B2* | 3/2018 | Hitsman | B60P 7/0846 |
| 2005/0145747 A1* | 7/2005 | Breeden, III | B60P 7/0846 242/588 |
| 2016/0376092 A1* | 12/2016 | Breeden, III | B65D 25/106 206/341 |
| 2017/0113597 A1* | 4/2017 | Hitsman | B65H 54/585 |
| 2018/0057250 A1* | 3/2018 | Breeden, III | B60P 7/0846 |

* cited by examiner

*Primary Examiner* — William E Dondero
(74) *Attorney, Agent, or Firm* — Gurr & Brande, PLLC; Robert A. Gurr

(57) ABSTRACT

A strap storage container has a strap storage rack and a crank mechanism for coiling the straps. The crank mechanism passes through the storage container and has a handle on a first end and strap receiving aperture (e.g., a slot) on a second end. The strap storage rack is removably insertable within the strap storage container.

8 Claims, 9 Drawing Sheets

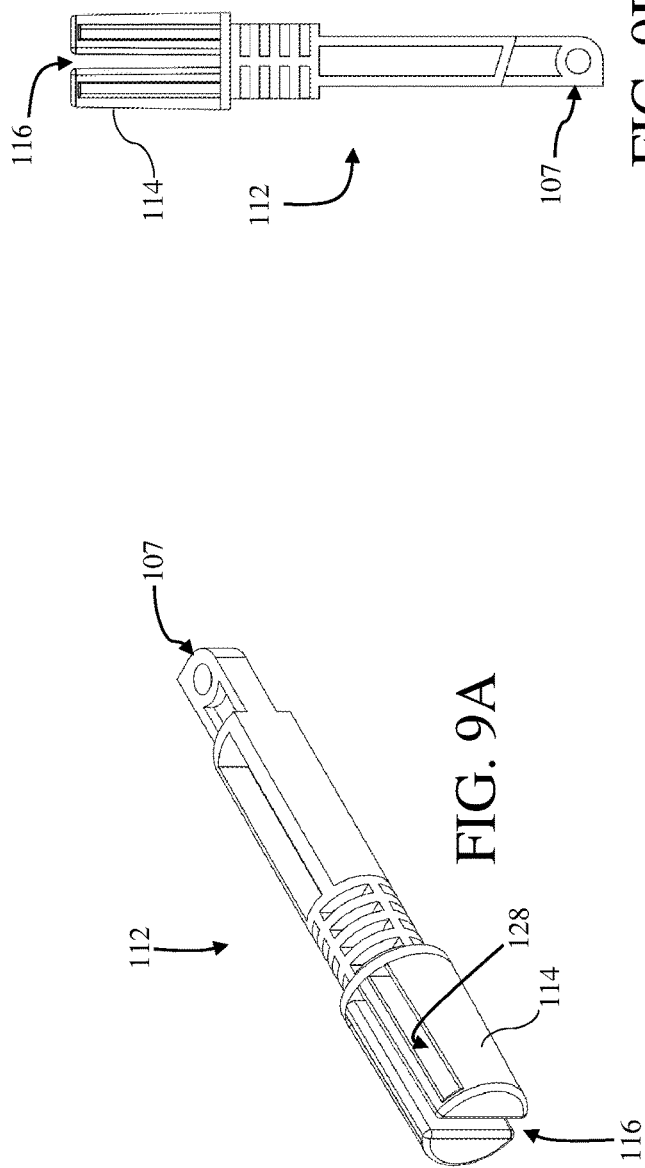
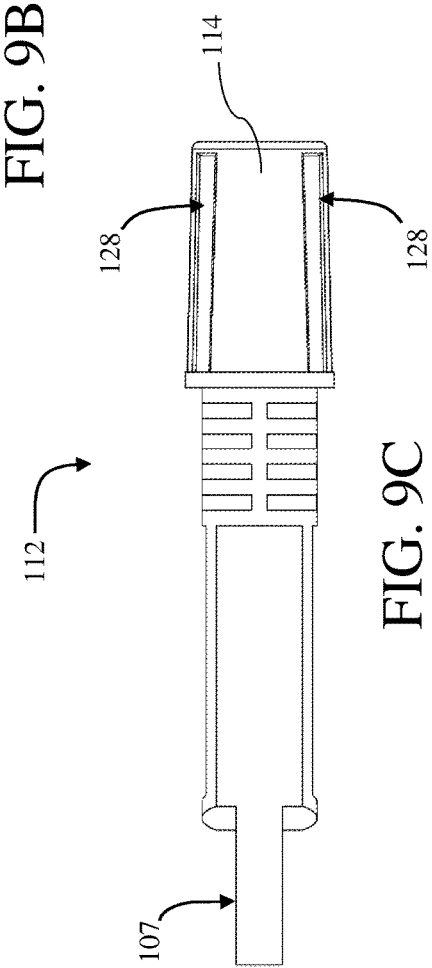
FIG. 9A
FIG. 9B
FIG. 9C

CONTAINER AND CRANK APPARATUS FOR TIE-DOWN STRAPS

CROSS-REFERENCE TO RELATED APPLICATIONS

This application claims the benefit of U.S. Provisional Application Ser. No. 62/201,628, filed on Aug. 6, 2015, which is incorporated herein by reference.

TECHNICAL FIELD

The present disclosure relates to tie-down straps and methods of storing them. In particular, the current disclosure relates to a container for storing the straps with a built-in winding crank.

BACKGROUND

Tie-down straps, often simply referred to as "tie-downs," are used globally for securing one or more objects to any given spot or other object. They have proven very effective in this job and are well-known in the art. Often made from polyester or other suitable material, they generally do not expand or contract a significant amount. In other words, when not in use, the strap does not generally contract to a smaller size. This limitation makes storage of unused straps a global problem as well. Some users coil the strap by hand and place it in storage, hoping it will remain undisturbed until the next use. Other users pile them in a drawer or bucket, while others may place them on a counter or even the floor (e.g., garage floor). Some users prefer bags so that they may take the straps with them while travelling. However, despite the coiling and placement, most users have experience with tangled or knotted straps. This is a very common problem in the industry. As such, when in need of a tie-down strap to secure an object, a user will open the strap bag and dump a mass of straps, hooks, and ratchet ends on to the ground. After selecting and untangling the appropriate strap or straps from the mass, the object is secured and the remaining straps are then tossed back into the strap bag. Upon reaching the destination, the cargo is freed from the straps and they are likewise tucked back in to the strap bag to become part of the tangled mass once again. Regardless of how they are kept, the straps inevitably become tangled and end up in a disorganized, tangled mass. The current disclosure seeks to solve these and other problems.

SUMMARY OF EXAMPLE EMBODIMENTS

In one embodiment, a strap storage container comprises a strap storage rack and a crank for coiling the straps. The crank comprises a handle on a first end and strap receiving aperture on a second end.

In another embodiment, the strap storage rack is removably insertable within the strap storage container. In yet another embodiment, the crank is removably insertable within the strap storage container.

BRIEF DESCRIPTION OF THE DRAWINGS

FIG. 9A is a perspective view of a rod insertable into a strap storage container;

FIG. 9B is a side elevation view of a rod insertable into a strap storage container; and FIG. 9C is a top view of a rod insertable into a strap storage container.

DETAILED DESCRIPTION OF EXAMPLE EMBODIMENTS

Figure 1:
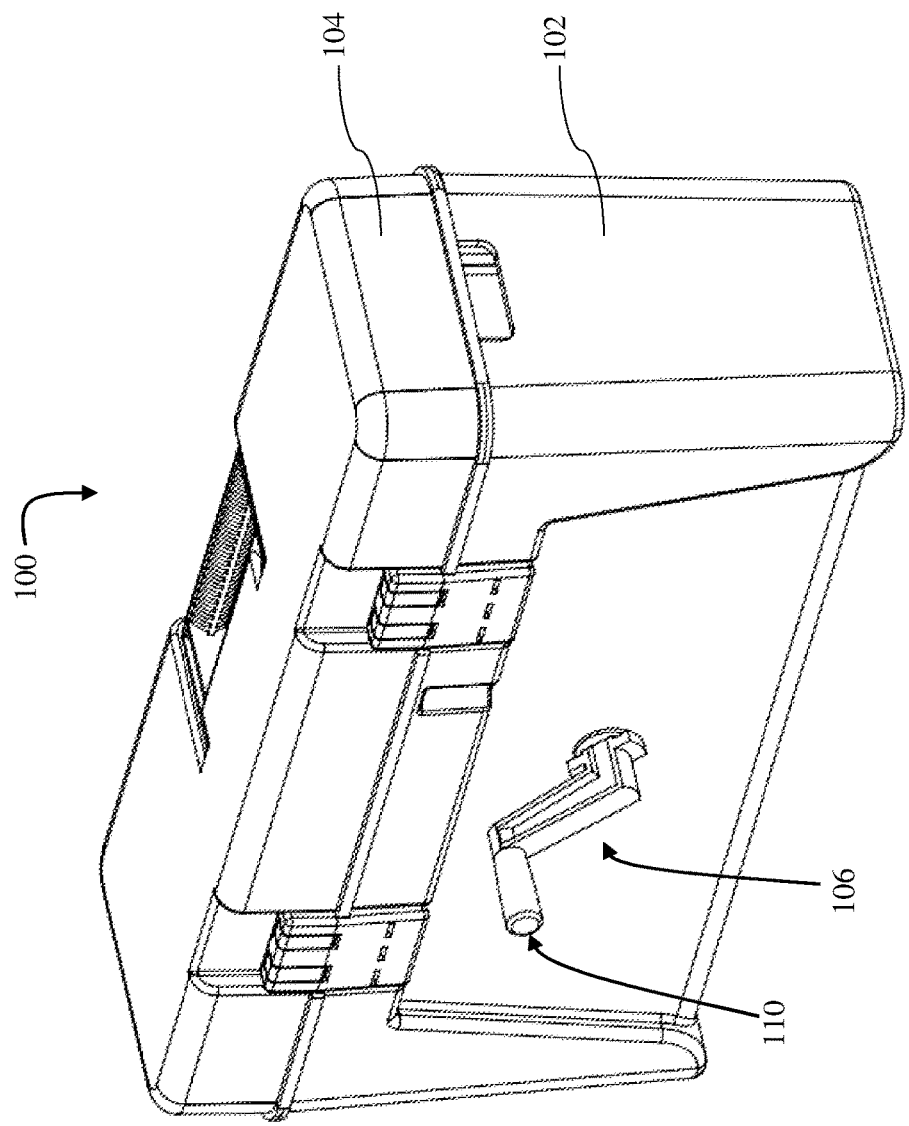
FIG. 1 is a front perspective view of a strap storage container.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As disclosed herein, a strap storage container allows for a user to coil straps using a built-in crank mechanism and to organize and store straps (e.g., tie-down straps). By so doing, the strap storage container solves the common problem of conveniently winding (coiling) a strap and storing it. While tie-down straps are used as an example herein, the present invention is not so limited, and the container may be adjusted in size so as to accommodate a wide range of sizes of straps.

Figure 2:
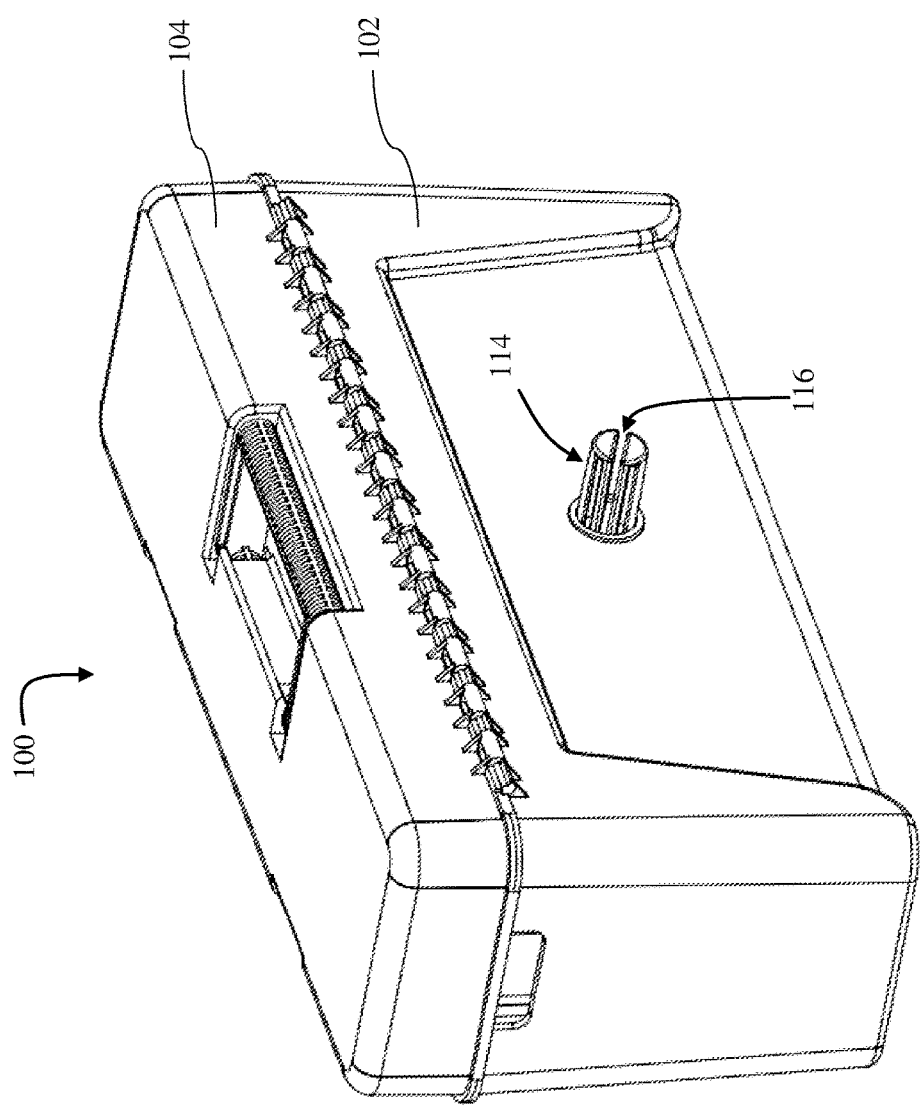
FIG. 2 is a rear perspective view of a strap storage container.
Figure 3:
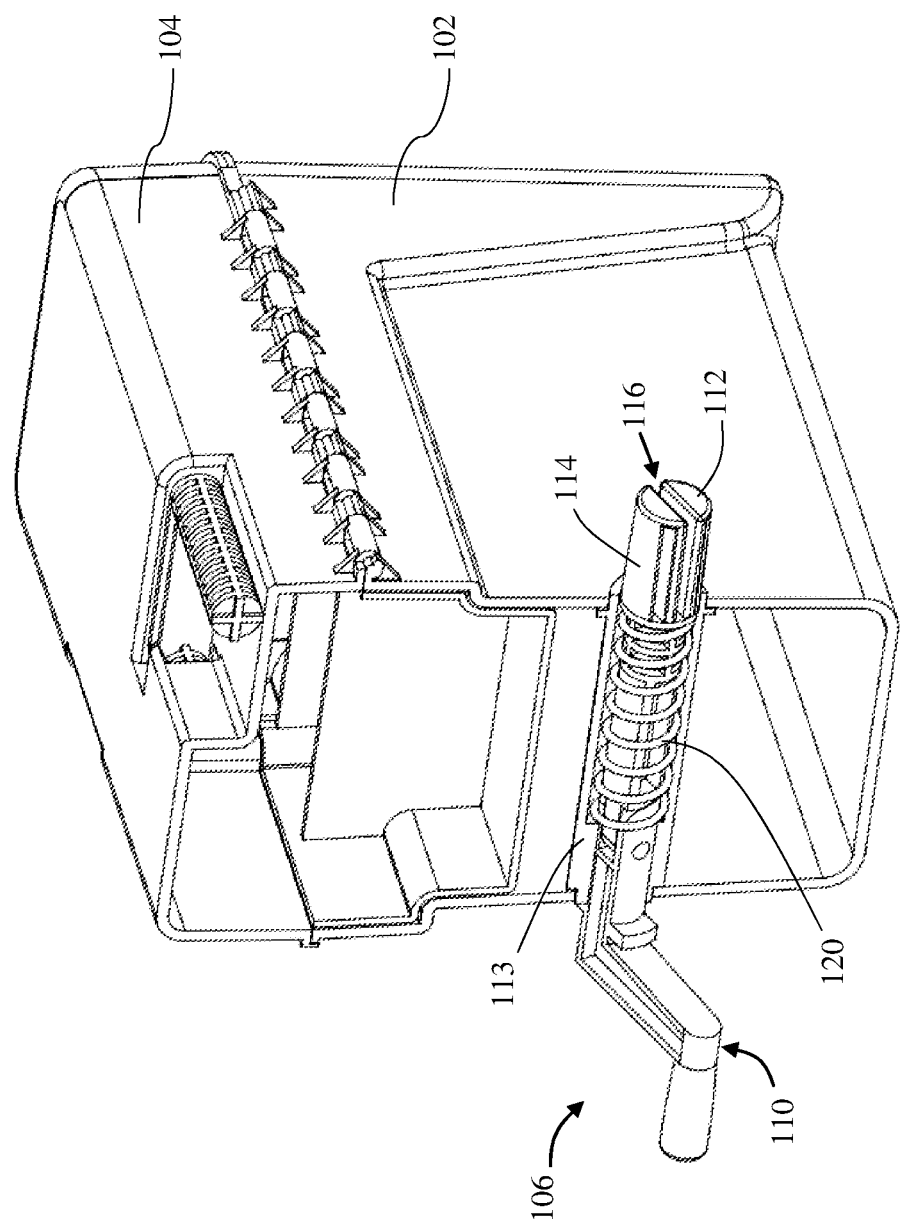
FIG. 3 is a cutaway view of a strap storage container.
Figure 4:
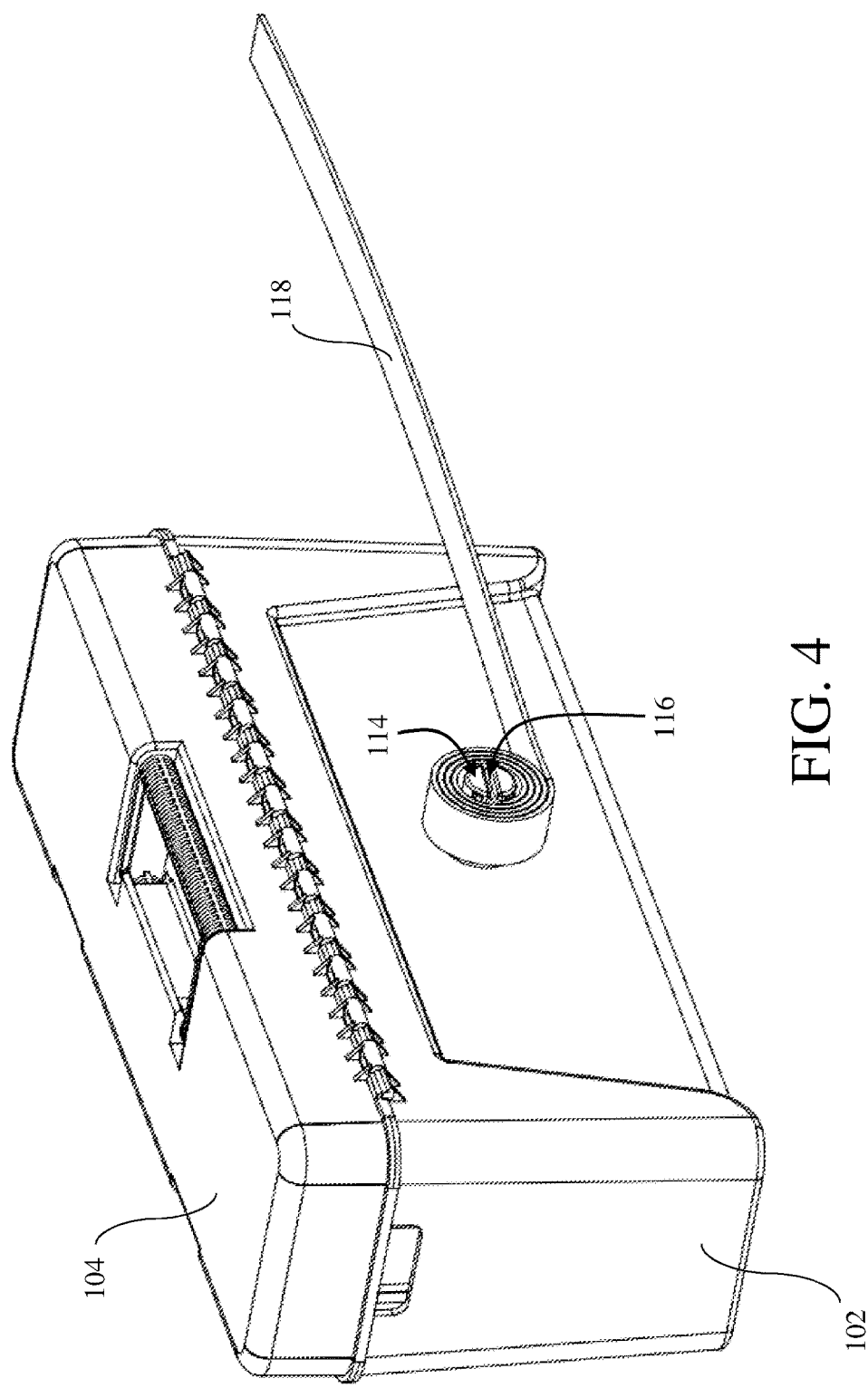
FIG. 4 illustrates a storage strap being wound on the crank on the rear side of the strap storage container.
Figure 8:
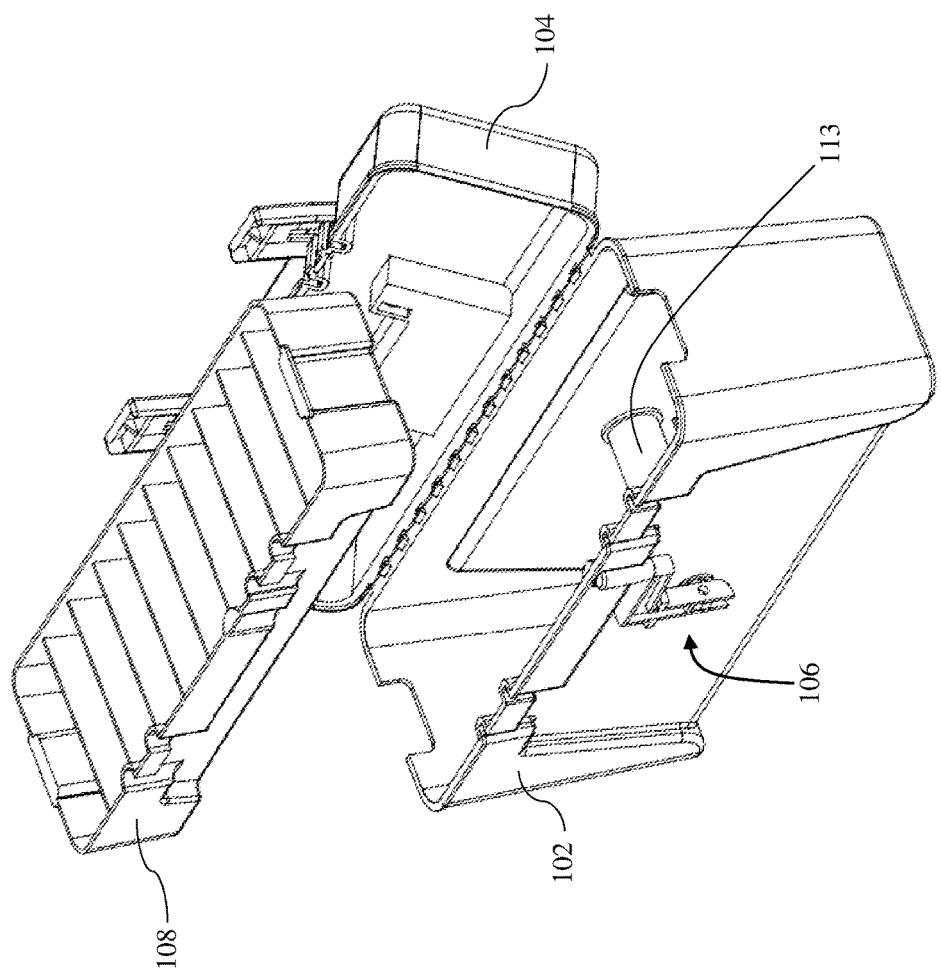
FIG. 8 is a perspective view with the removable storage rack removed from the strap storage container.

In one embodiment, as generally shown in FIGS. 1-3, a strap storage container 100 comprises a housing 102, the housing 102 having a removable or hinged lid 104, a crank mechanism 106, and a strap storage rack 108 (best seen in FIG. 8). It will be appreciated that while a rack 108 is described herein, it is not required, and the strap storage container 100 may simply comprise a hollow compartment. Referring to FIG. 3, the crank mechanism 106 comprises a handle portion 110 coupled to a rod 112 (such as by using a spring loaded pin, screw, bolt, or other mechanism at a first end 124 (see FIG. 6) of the handle portion 110 and a coupling end 107 (see FIGS. 9A-9C) of the rod 112, collectively the pivot point 109 (FIGS. 5 & 6), the rod 112 extending through the housing 102 and extending out of the housing 102 on a rear side, ending in a strap receiving end 114. As shown in FIGS. 3 & 4, the strap receiving end 114 comprises one or more slots 116 (or other aperture) for receiving the end of a strap 118 for coiling. For example, a user would place the end of a strap 118 in the slot 116, and, while maintaining the strap 118 on the receiving end 114, will rotate the handle (i.e., turn the crank), which rotates the rod 112, thereby coiling the strap 118. Once the strap 118 is coiled, a user slides the strap 118 off of the receiving end 114 (which may also be accomplished by retracting the receiving end 114 into the housing 102, as discussed later) and may then place the coiled strap within a compartment of the storage rack 108 for storage.

As best seen in FIG. 3, the rod 112 passes through the interior hollow space of the housing 102 and may comprise one or more springs 120. In more detail, the rod 112 fits within a receiving sheath 113 that extends from a first inner wall of the housing 102 to the rear inner wall of the housing 102. The rod 112 is configured to slide horizontally within the sheath 113 as well as rotate therein, the rod 112 having the coil spring 120 around its circumference and putting pressure on the receiving end 114 (i.e., the receiving end 114 may be larger in diameter than the middle of the rod 112, allowing the spring 120 to be stopped, and put pressure on, the receiving end 114, as best seen in FIGS. 9A-9C). On the opposite side of the rod 112 and spring 120, the sheath 113 has a smaller opening, which prohibits the spring 120 from exiting the housing 102, and, likewise, allows the spring 120 to be pressurized when the handle portion 110 is extracted from the housing 102. For example, as a user pulls on handle portion 110, the receiving end 114 is pulled within the housing 102, which causes the spring 120 to compress. With the handle portion 110 withdrawn from the housing, a user may store the handle portion 110, as detailed more below herein. If the handle portion 110 is released, the spring 120 extends, thereby forcing the receiving end 114 out of the housing 102. The sheath 113 may be permanently fixed to the housing, or may be removable by using set screws, locking pins, using flexible materials that can bend to allow the sheath 113 to be released from the housing apertures, etc.

Figure 5:
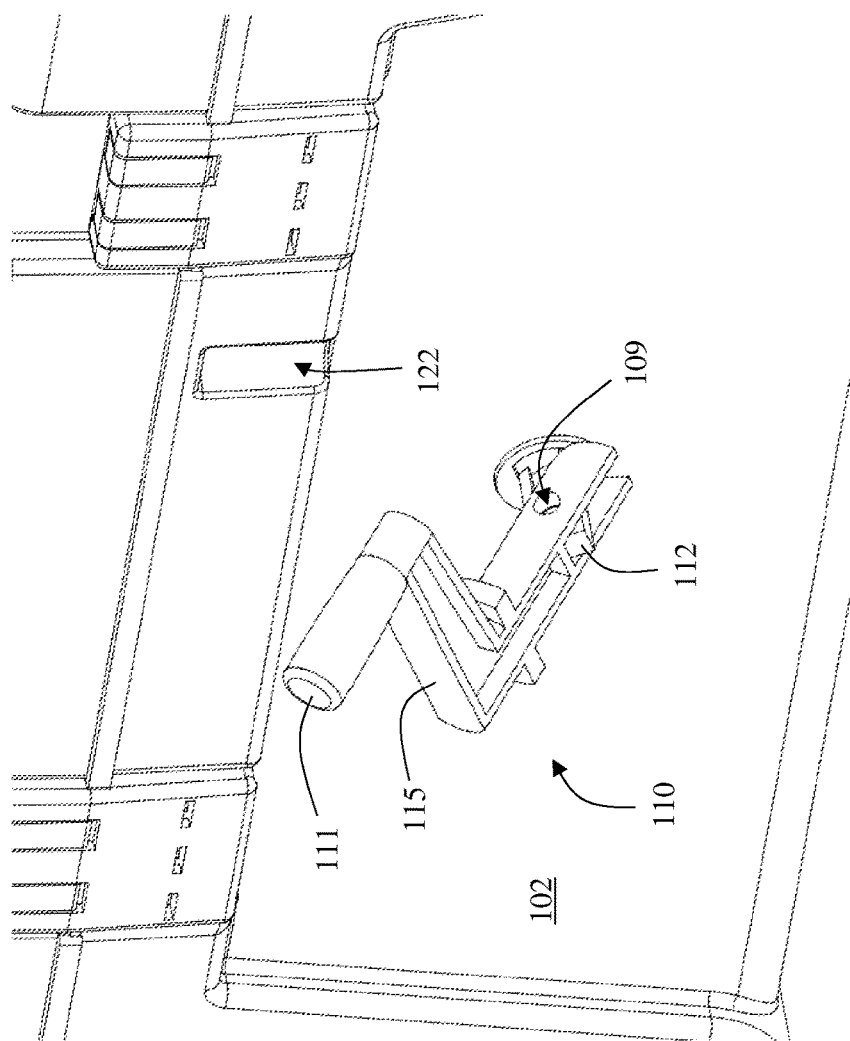
FIG. 5 is a detailed view of the handle portion of the strap storage container.
Figure 6:
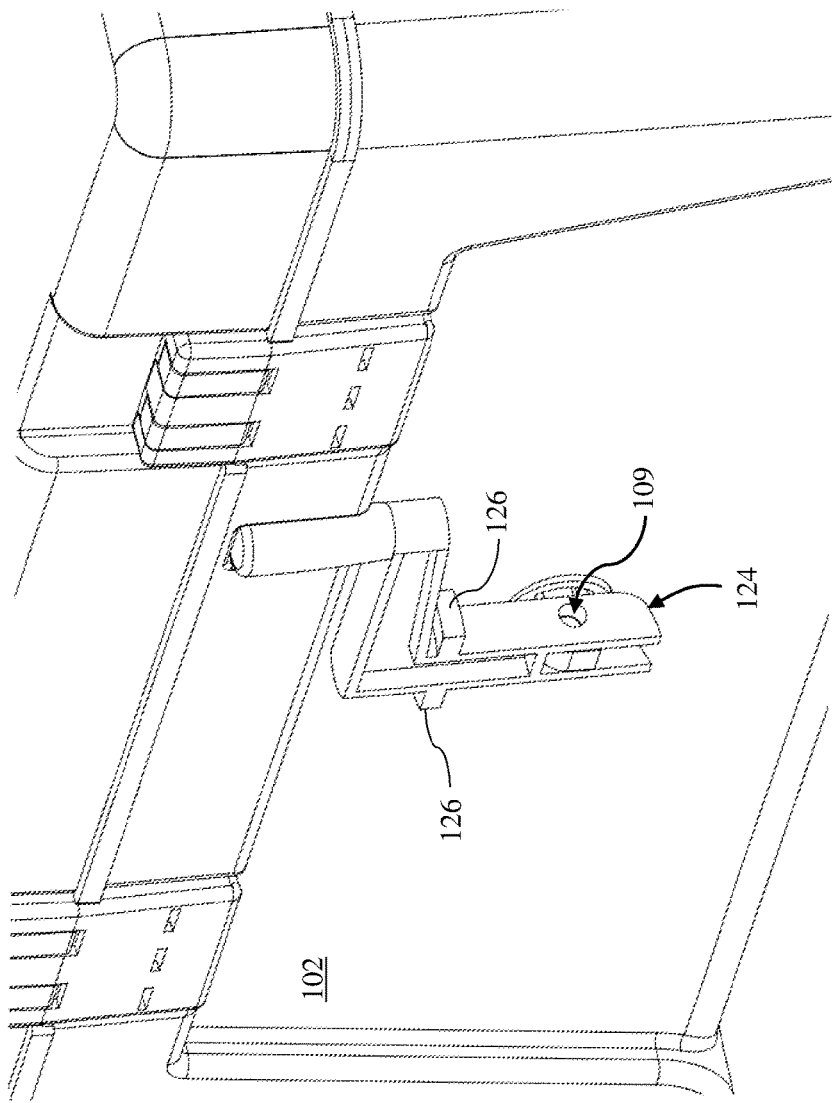
FIG. 6 is a detailed view of the handle portion in a stored position.
Figure 7:
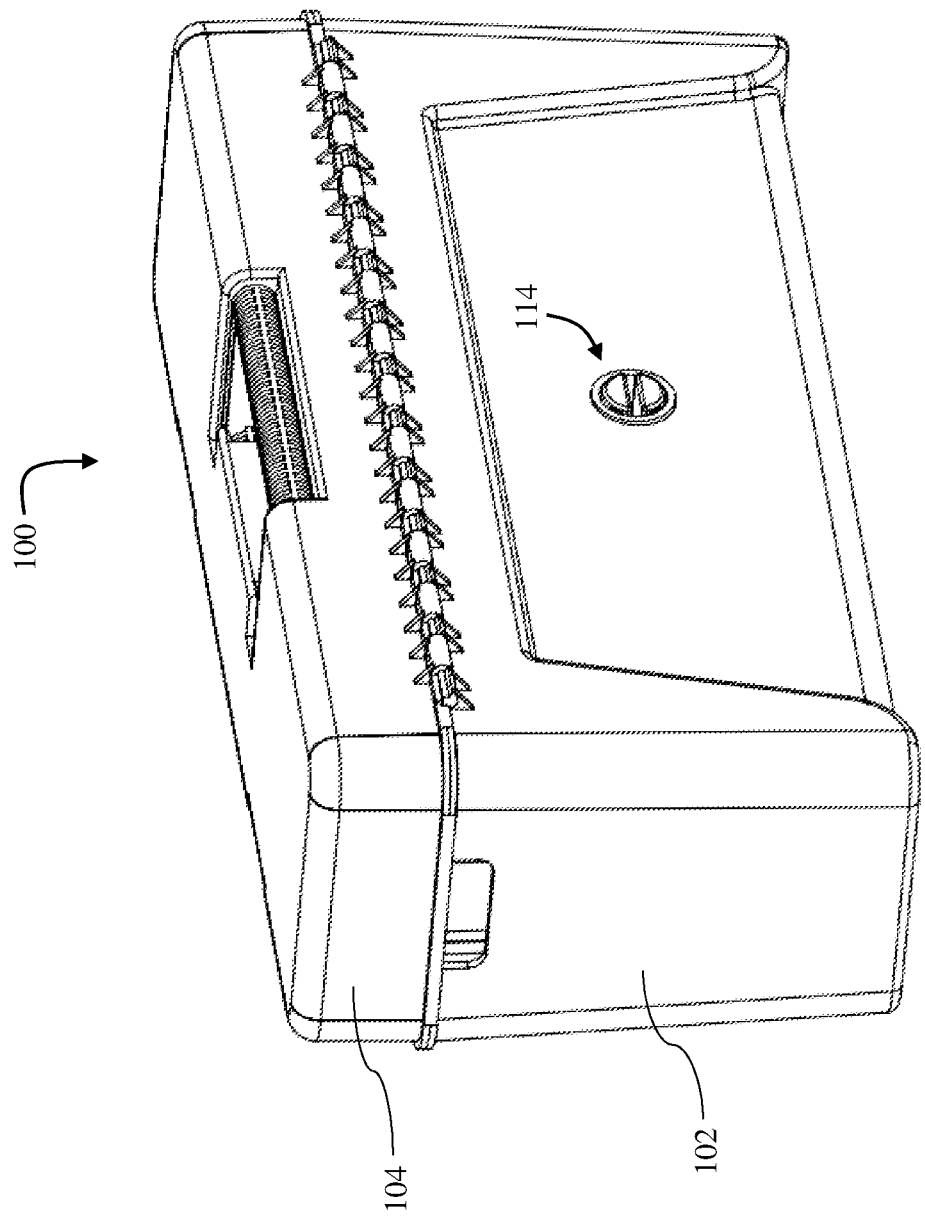
FIG. 7 is a rear perspective view showing the crank withdrawn into the strap storage container for storage.

Turning to the detailed views of FIGS. 5-6, the handle portion 110 comprises a handle 111 coupled to a lever arm 115, which is pivotally coupled to the rod 112 (such as by using a bolt or locking pin). When not in use, the handle portion 110 may be pivoted upwardly and fastened to the container 102 for storage as shown in FIG. 6. For example, a handle aperture 122 in the housing 102 receives and holds the handle portion 110 in place using tension. In other words, the handle 111 is slightly wider than the handle aperture 122 such that a user can push the handle 111 into the handle aperture 122 using slight pressure. While tension is used as an example securing means, other securing means may be used, such as hooks, snaps, locking pins, etc. When the handle portion 110 is secured using the handle aperture 122 (FIG. 6), the receiving end 114 is fully within the housing 102, so that the end of the receiving end 114 rests about flush with the housing sidewall (FIG. 7). When a user withdraws the handle portion 110 from the stored position (i.e., secured to the lid 104 of the housing 102) and pivots it downward for use, a first end 124 rotates from a substantially perpendicular position to the rod 112 to a position wherein the first end 124 extends longitudinally from the rod 112. As the first end 124 pivots and reaches the position of extending longitudinally from the rod 112, the spring 120 (FIG. 3) forces the receiving end 114 out of the housing 102 until it is stopped by one or more flanges 126. As the first end 124 enters the housing 102, the opposite end (receiving end 114) is forced out of the housing 102 an equal distance, exposing the slot 116 for coiling a strap.

Once the strap 118 is coiled and removed from the receiving end 114, the user may pull on the handle portion 110 so as to withdraw the first end 124 from within the housing 102. Once the first end 124 is fully withdrawn, the user may then rotate and/or pivot the handle portion 110 so that it is receivable within the handle aperture 122. As discussed above, the receiving end 114 of the rod 112 is larger than the opening of the sheath 113 on the front side, preventing the rod 112 from being withdrawn when a user pulls on the handle portion 110. Should a user desire to remove the rod 112 (for repair or replacement of the rod or spring), a user would simply withdraw the handle portion 110 from the housing 102, de-couple the handle portion 110 from the rod 112 (such as by removing a screw, bolt, or depressing a spring-loaded locking pin), which allows the rod to be removed from the opposite side of the housing. It will be appreciated that the rod can be made to be removable or non-removable, and that such variations do not depart herefrom.

As shown in FIGS. 9A-9C, the rod 112 may comprise additional strap end apertures 128 to aid in coiling the strap. For example, a user would slide the strap through the slot 116 and then insert the end of the strap into an end aperture 128 so that when the user begins to actuate the crank mechanism 106, the strap does not slide out of the slot 116 and instead is coiled.

In one embodiment, the strap storage container 100 may be dimensioned so as to be conveniently stored behind the seat of a truck or any other similar space. It will be appreciated that while the figures depict a rectangular shaped housing, the present invention is not so limited. Further, the strap storage container may be manufactured from various materials, including plastics, metals, woods, carbon fibers, or any other strong and durable material.

In one method of use, a user would place the end of a strap 118 in receiving aperture 116. The user would then actuate the crank mechanism 106 using handle 111 and lever 115. Once the strap 118 begins to coil, a user will hold the strap 118 taut with one hand while cranking with the other. Once the strap 118 is completely coiled, the user would remove it from the receiving end 114 by sliding it sideways off of the rod 112. Once removed, the coiled strap would then be placed in a compartment of a strap storage rack 108. Any accompanying ratchets or other accessories would be placed either beneath the strap storage rack 108, if the strap storage rack 108 is removable, or in a compartment of the strap storage rack 108 as well. The lid 104 would then be closed and the container strap storage container 100 stored until the next use.

What is claimed is:

1. A strap storage container, comprising:
    a housing with a lid opening to a hollow compartment;
    a crank mechanism, wherein the crank mechanism comprises a handle coupled to a lever arm, the lever arm being pivotally coupled to a rod, the rod passing through a first side of the housing, extending across the hollow compartment, and exiting on a second side of the housing, the rod having an aperture on a receiving end configured to receive a strap; and
    wherein the rod is configured to rotate within the housing.

2. The strap storage container of claim 1, further comprising a strap storage rack for storing coiled straps.

3. The strap storage container of claim 2, wherein the strap storage rack is removable.

4. The strap storage container of claim 1, wherein the crank mechanism comprises a spring configured to force the receiving end of the rod out of the container.

5. The strap storage container of claim 1, wherein the lever arm comprises at least one flange for preventing the lever arm from coming into contact with the housing.

6. The strap storage container of claim 1, comprising a handle aperture configured to receive and store the handle of the crank mechanism.

7. The strap storage container of claim 1, wherein the rod further comprises strap end apertures configured to receive the end of a strap.

8. A strap storage container, comprising:
    a rectangular housing and a hinged lid, the rectangular housing forming a hollow storage compartment;
    a removable storage rack within the hollow compartment of the housing;
    a crank mechanism comprising a handle coupled to a lever arm, the lever arm being pivotally coupled to a rod, the rod passing through a first side of the housing and entering a sheath extending across the hollow compartment under the removable storage rack, the rod exiting the sheath and housing on a second side of the housing, the rod having an aperture on a receiving end configured to receive a strap, and the rod being configured to rotate within the housing;
    a spring located within sheath and circling the circumference of the rod, the spring configured to force the receiving end out of the housing when the spring is decompressed, the rod extending until at least one flange on the lever arm comes into contact with the housing;
    the lever arm configured to pivot on the rod at a pivot point so as to allow the lever and handle to be parallel with, and proximate to, the housing; and
    wherein a handle aperture is configured to receive and secure the handle.

* * * * *